United States Patent
Hatada et al.

(10) Patent No.: US 11,872,700 B2
(45) Date of Patent: Jan. 16, 2024

(54) ROBOT WITH A TORQUE SENSOR AND A FORCE SENSOR

(71) Applicant: FANUC CORPORATION, Yamanashi (JP)

(72) Inventors: Yasunobu Hatada, Yamanashi (JP); Toshihiro Nishimura, Yamanashi (JP); Kazutaka Nakayama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 278 days.

(21) Appl. No.: 16/807,468

(22) Filed: Mar. 3, 2020

(65) Prior Publication Data
US 2020/0338727 A1    Oct. 29, 2020

(30) Foreign Application Priority Data

Apr. 26, 2019   (JP) ................................. 2019-085597

(51) Int. Cl.
   *B25J 9/16*    (2006.01)
   *B25J 17/02*   (2006.01)
   *B25J 13/08*   (2006.01)

(52) U.S. Cl.
   CPC ........... *B25J 9/1633* (2013.01); *B25J 17/025* (2013.01); *B25J 13/085* (2013.01)

(58) Field of Classification Search
   CPC ....... B25J 9/1633; B25J 17/025; B25J 13/085
   USPC .......................................... 74/490.01, 490.05
   See application file for complete search history.

(56) References Cited

U.S. PATENT DOCUMENTS

| 4,591,944 | A | 5/1986 | Gravel |
| 11,453,122 | B2* | 9/2022 | Knott ..................... B25J 13/085 |
| 2007/0120512 | A1* | 5/2007 | Albu-Schäffer ....... B25J 9/1643 |
| | | | 318/568.2 |
| 2009/0088899 | A1 | 4/2009 | Johansson et al. |
| 2010/0234996 | A1 | 9/2010 | Schreiber et al. |
| 2010/0324733 | A1 | 12/2010 | Bischoff et al. |

(Continued)

FOREIGN PATENT DOCUMENTS

| EP | 1 764 192 A1 | 3/2007 | |
| EP | 3363603 A1 * | 8/2018 | ............. B25J 13/06 |

(Continued)

OTHER PUBLICATIONS

Japanese Office Action dated Aug. 17, 2021, in connection with corresponding JP Application No. 2019-085597A (9 pp., including machine-generated English translation).

(Continued)

*Primary Examiner* — T. Scott Fix
(74) *Attorney, Agent, or Firm* — Maier & Maier, PLLC (57) ABSTRACT

A robot includes: a first member; a second member that is rotationally driven around a first axis with respect to the first member; a third member that is rotationally driven around a second axis with respect to the second member, the second axis being located at an interval from the first axis; a single axis torque detection unit that detects only at least one of torque around the first axis and torque around the second axis; and a force sensor that is provided between the first member and a surface to be installed, or in the first member, the second member or the third member, and is capable of detecting force in a direction intersecting with both the first axis and the second axis.

15 Claims, 7 Drawing Sheets

(56) References Cited

U.S. PATENT DOCUMENTS

| | | | |
|---|---|---|---|
| 2013/0255426 A1 | 10/2013 | Kassow et al. | |
| 2015/0081098 A1* | 3/2015 | Kogan | B25J 9/1656 901/46 |
| 2015/0143707 A1* | 5/2015 | Goto | G01B 5/008 33/503 |
| 2015/0290809 A1* | 10/2015 | Nakagawa | B25J 13/085 700/258 |
| 2015/0367510 A1* | 12/2015 | Naitou | B25J 9/1676 901/9 |
| 2016/0089790 A1* | 3/2016 | Wang | B25J 9/1694 700/255 |
| 2016/0114484 A1 | 4/2016 | Nakayama et al. | |
| 2017/0285625 A1 | 10/2017 | Sato et al. | |
| 2018/0065256 A1 | 3/2018 | Naitou | |
| 2019/0030721 A1 | 1/2019 | Hoshiyama | |
| 2020/0070342 A1 | 3/2020 | Hannya et al. | |

FOREIGN PATENT DOCUMENTS

| | | |
|---|---|---|
| JP | 2006-000955 A | 1/2006 |
| JP | 2015-100871 A | 6/2015 |
| JP | 2015-199174 A | 11/2015 |
| JP | 2016-064474 A | 4/2016 |
| JP | 2016-083710 A | 5/2016 |
| JP | 5980877 B2 | 8/2016 |
| JP | 2017-159427 A | 9/2017 |
| JP | 2017-177293 A | 10/2017 |
| JP | 2018-012193 A | 1/2018 |
| JP | 2018-039086 A | 3/2018 |
| JP | 2019-025604 A | 2/2019 |
| JP | 2019-042906 A | 3/2019 |
| JP | 2020-032488 A | 3/2020 |
| WO | 2007/031514 A1 | 3/2007 |
| WO | 2009/083111 A1 | 7/2009 |

OTHER PUBLICATIONS

Japanese Search Report dated Jul. 29, 2021, in connection with corresponding JP Application No. 2019-085597A (31 pp., including machine-generated English translation).

* cited by examiner

ROBOT WITH A TORQUE SENSOR AND A FORCE SENSOR

CROSS-REFERENCE TO RELATED APPLICATIONS

This application claims the benefit of Japanese Patent Application No. 2019-085597, the content of which is incorporated herein by reference.

FIELD

The present disclosure relates to a robot.

BACKGROUND

There is known a robot having a force sensor disposed in a base installed on a floor surface (for example, the Publication of Japanese Patent No. 5980877). Additionally, there is known a robot including a torque sensor in each of joint shafts (for example, U.S. Unexamined Patent Application, Publication No. 2013/0255426).

SUMMARY

An aspect of the present disclosure is a robot including: a first member; a second member that is rotationally driven around a first axis with respect to the first member; a third member that is rotationally driven around a second axis with respect to the second member, the second axis being located at an interval from the first axis; a single axis torque detection unit that detects only at least one of torque around the first axis and torque around the second axis; and a force sensor that is provided between the first member and a surface to be installed, or in the first member, the second member or the third member, and is capable of detecting force in a direction intersecting with both the first axis and the second axis.

DETAILED DESCRIPTION OF EMBODIMENTS

A robot 1 according to an embodiment of the present disclosure will be hereinafter described with reference to the drawings.

Figure 1:
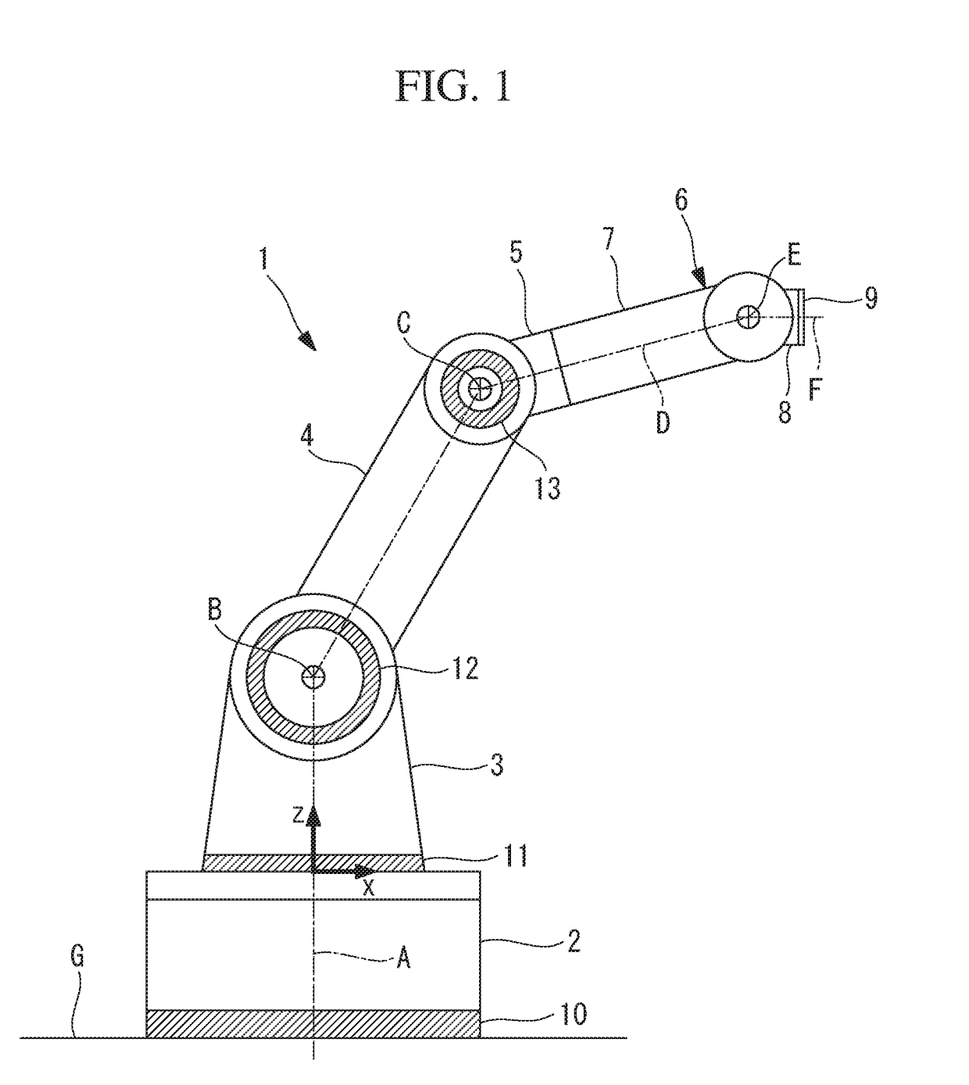
FIG. 1 is a side view illustrating an example of a robot according to an embodiment of the present disclosure.

The robot 1 according to this embodiment includes a base 2 installed on a floor surface (surface to be installed) G, and a rotary barrel (first member) 3 rotatably supported around a vertical J1 axis (third axis) A with respect to the base 2. Additionally, the robot 1 includes a first arm (second member) 4 rotatably supported around a horizontal J2 axis (first axis) B with respect to the rotary barrel 3, and a second arm (third member) 5 rotatably supported around a J3 axis (second axis) C parallel to the J2 axis B with respect to the first arm 4.

The robot 1 includes a 3-axis wrist unit 6 at a tip of the second arm 5.

The wrist unit 6 includes a first wrist element 7 rotatably supported around a J4 axis (fourth axis) D extending in the longitudinal direction of the second arm 5 with respect to the second arm 5. The wrist unit 6 includes a second wrist element 8 rotatably supported around a J5 axis (fifth axis) E orthogonal to the J4 axis D with respect to the first wrist element 7. Furthermore, the wrist unit 6 includes a third wrist element 9 rotatably supported around a J6 axis (sixth axis) F orthogonal to the J5 axis E and passing through an intersection of the J4 axis D and the J5 axis E with respect to the second wrist element 8.

The robot 1 according to this embodiment includes a single axis torque sensor (third single axis torque detection unit) 10 that is disposed between the floor surface G and the base 2, and detects only torque around the J1 axis A. The robot 1 includes a force sensor 11 that is mounted on the rotary barrel 3, and detects force in the horizontal uniaxial direction (x-direction in an orthogonal coordinate system fixed to the rotary barrel 3) orthogonal to the J2 axis B and along a plane including the J1 axis A.

The robot 1 includes a single axis torque sensor (single axis torque detection unit, first single axis torque detection unit) 12 that detects only torque around the J2 axis B between the rotary barrel 3 and the first arm 4. Furthermore, the robot 1 includes a single axis torque sensor (second single axis torque detection unit) 13 that detects only torque around the J3 axis C between the first arm 4 and the second arm 5.

The torque detected by each of the single axis torque sensors 10, 12, 13, and force detected by the force sensor 11 are sent to a control apparatus (not illustrated), and in a case where torque or force that exceeds a predetermined threshold value is detected, the control apparatus causes the robot 1 to perform stop operation or retreating operation.

According to thus configured robot 1 of this embodiment, in a case where an object is interposed between the rotary barrel 3 and the first arm 4, torque detected by the single axis torque sensor 12 that detects torque around the J2 axis B exceeds a threshold value to be increased. In a case where an object is interposed between the first arm 4 and the second arm 5, torque detected by the single axis torque sensor 13 that detects torque around the J3 axis C exceeds a threshold value to be increased. Consequently, it is possible to detect that an object is interposed between the parts, and perform the stop operation or the retreating operation.

Also in a case where a tool mounted on the wrist unit 6 or a tip of the wrist unit 6 comes into contact with the rotary barrel 3 or the first arm 4, the torque around the J2 axis B or the torque around the J3 axis C is increased, and therefore it is possible to detect the increased torque, and perform the stop operation or the retreating operation.

That is, according to this embodiment, there is an advantage that contact by interposing between the arms 4, 5, or the like can be also detected compared to a conventional robot that has a six-axis force sensor that is disposed between the floor surface G and the base 2, and detects contact with an object.

Figure 2:
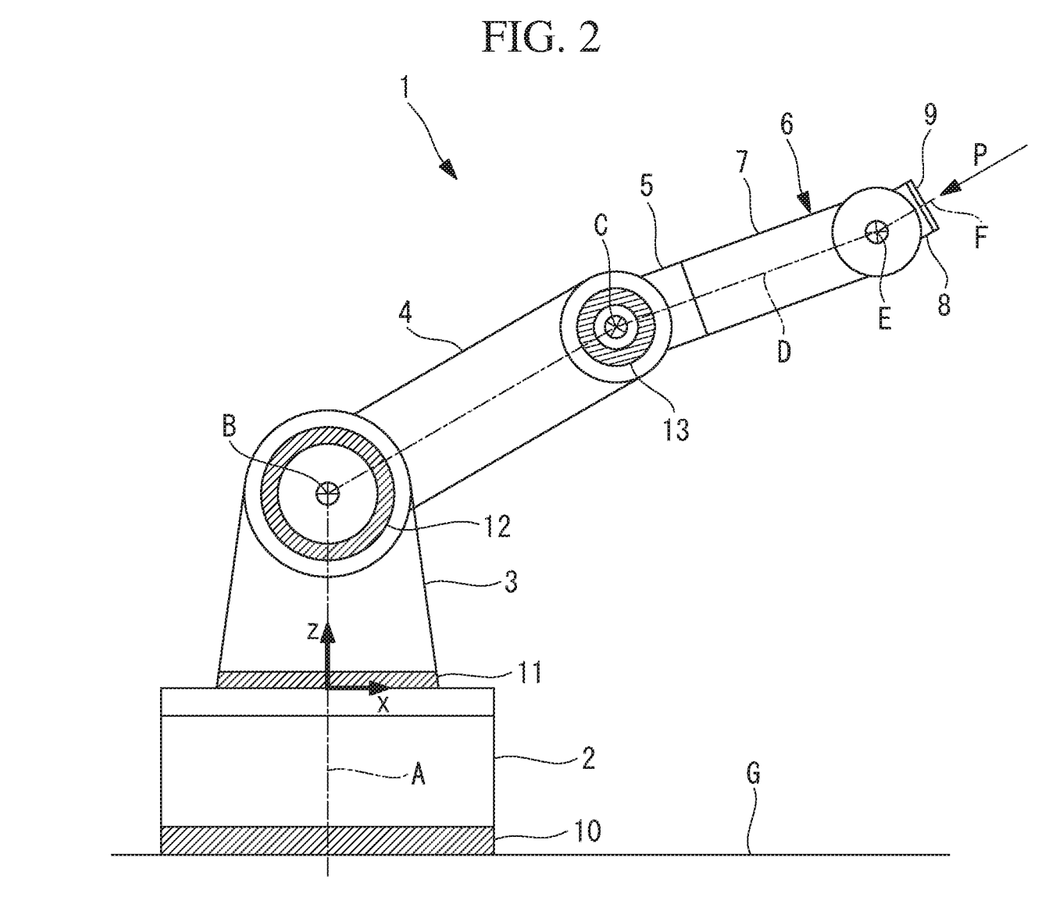
FIG. 2 is a side view illustrating a contact condition that cannot be detected by a single axis torque sensor of the robot of FIG. 1.

Now, as illustrated in FIG. 2, a case where the first arm 4 and the second arm 5 are arranged on a substantially the same straight line, and, for example, external force P acts on the wrist unit 6 in the direction along the straight line will be described.

In this case, torque detected by each of the two single axis torque sensors 12, 13 is not sufficiently increased, and therefore does not exceed the threshold value, and contact cannot be detected. However, a horizontal (x-direction) component of force that acts in the longitudinal direction of the first arm 4, that is, in the direction orthogonal to both the J2 axis B and the J3 axis C is detected by the force sensor 11 provided in the rotary barrel 3.

Therefore, according to this embodiment, there is an advantage that contact in a condition in which torque does not act on the torque sensor can be also detected by the force sensor 11 compared to a conventional robot that has a torque sensor disposed in each joint, and detects contact with an object.

Figure 3:
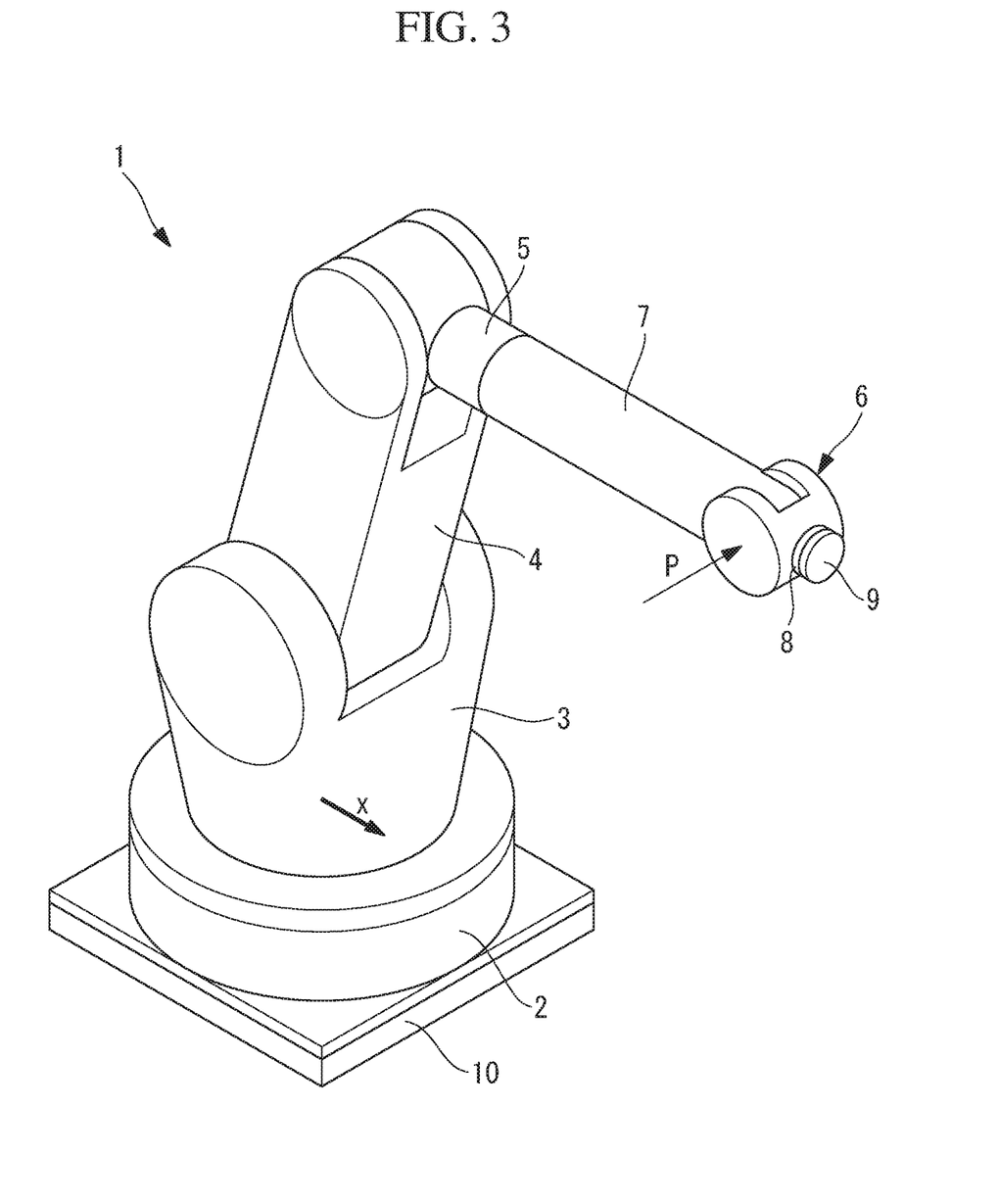
FIG. 3 is a perspective view illustrating the robot of FIG. 1.

For example, as illustrated in FIG. 3, in a case where lateral external force acts on the first arm 4, the second arm 5 or the wrist unit 6, torque detected by the single axis torque sensor 10 disposed between the floor surface G and the base 2 exceeds the threshold value to be increased. Consequently, it is possible to detect that an object comes into contact with the robot 1 from the lateral direction.

That is, according to this embodiment, in addition to the three single axis torque sensors 10, 12, 13 that detect only the torque around the J1 axis A, the torque around the J2 axis B, and the torque around the J3 axis C, the single force sensor 11 is disposed, and it is possible to detect also interposing of an object, and contact that cannot be detected by the single axis torque sensors 10, 12, 13. Consequently, there is an advantage that the robot 1 that detects every contact can be configured at a low cost by a simple structure in which the number of sensors to be mounted is reduced. The force sensor 11 is disposed in the rotary barrel 3, and therefore force that acts on the robot 1 can be detected without depending on the operation angle of the rotary barrel 3.

In this embodiment, the force sensor 11 detects only force in the x-direction. Therefore, as illustrated in FIG. 4, in a case where the first arm 4 and the second arm 5 extend in the direction along the J1 axis A, force that acts on the tip of the second arm 5 in the direction along the J1 axis A (z-direction) cannot be detected.

In a case where contact in such a condition is also detected, a sensor capable of detecting force in the x-direction and the z-direction may be employed as the force sensor 11. In a case where a sensor capable of detecting force in the x-direction and the y-direction is employed as the force sensor 11, the single axis torque sensor 10 disposed between the floor surface G and the base 2 may be eliminated. The force sensor 11 may be a sensor capable of detecting force in the x-direction, the y-direction and the z-direction.

Figure 5:
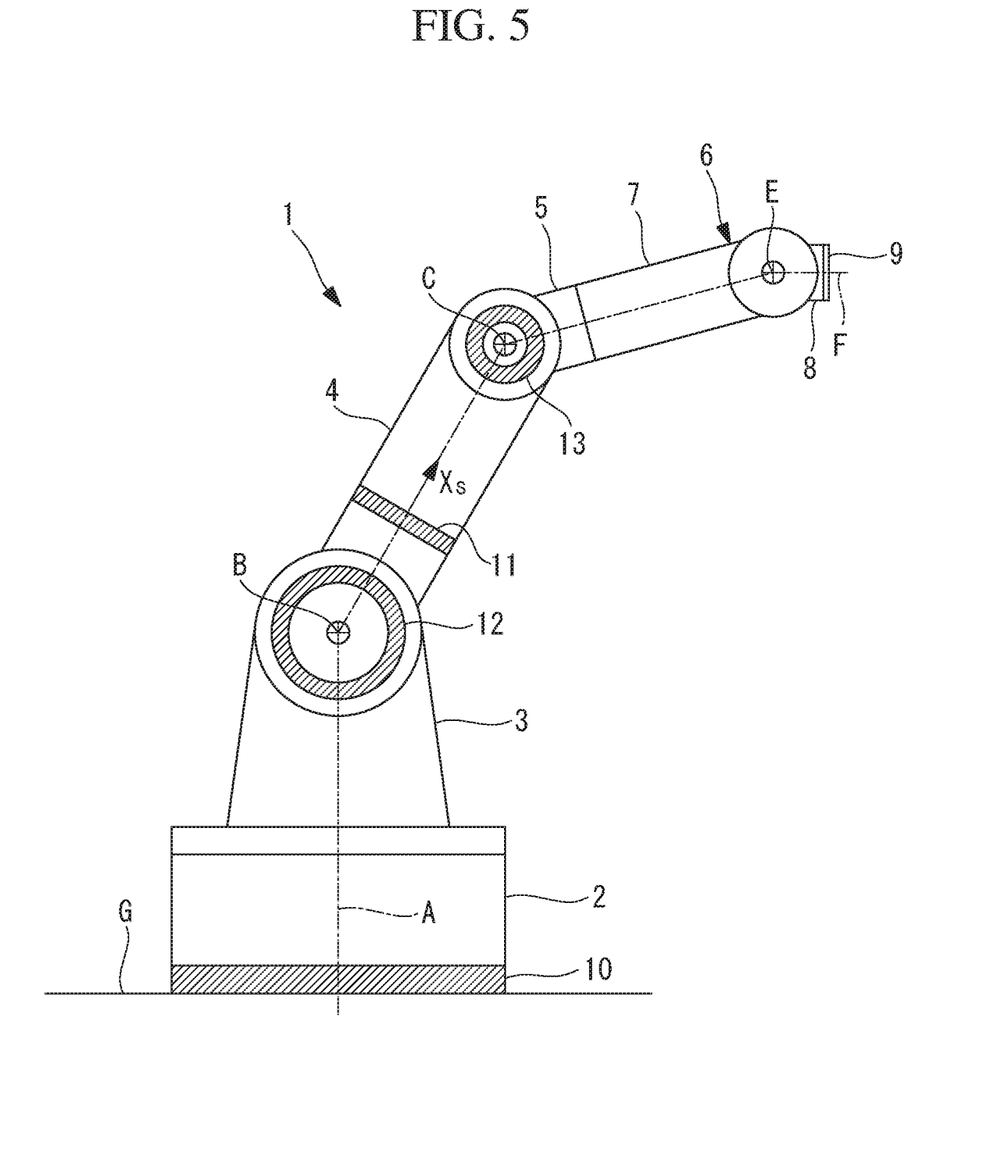
FIG. 5 is a side view illustrating a modification of the robot of FIG. 1.

In this embodiment, the force sensor 11 is installed in the rotary barrel 3. However, in place of the above, the force sensor 11 may be installed between the floor surface G and the base 2, or in the base 2, the first arm 4 or the second arm 5. Particularly, as illustrated in FIG. 5, the force sensor 11 is provided in the first arm 4, so that it is possible to detect force in the $x_s$-direction that is the longitudinal direction of the first arm 4, and force in the direction orthogonal to the J2 axis B and the J3 axis C can be detected without depending on the operation angle of the first arm 4.

Figure 4:
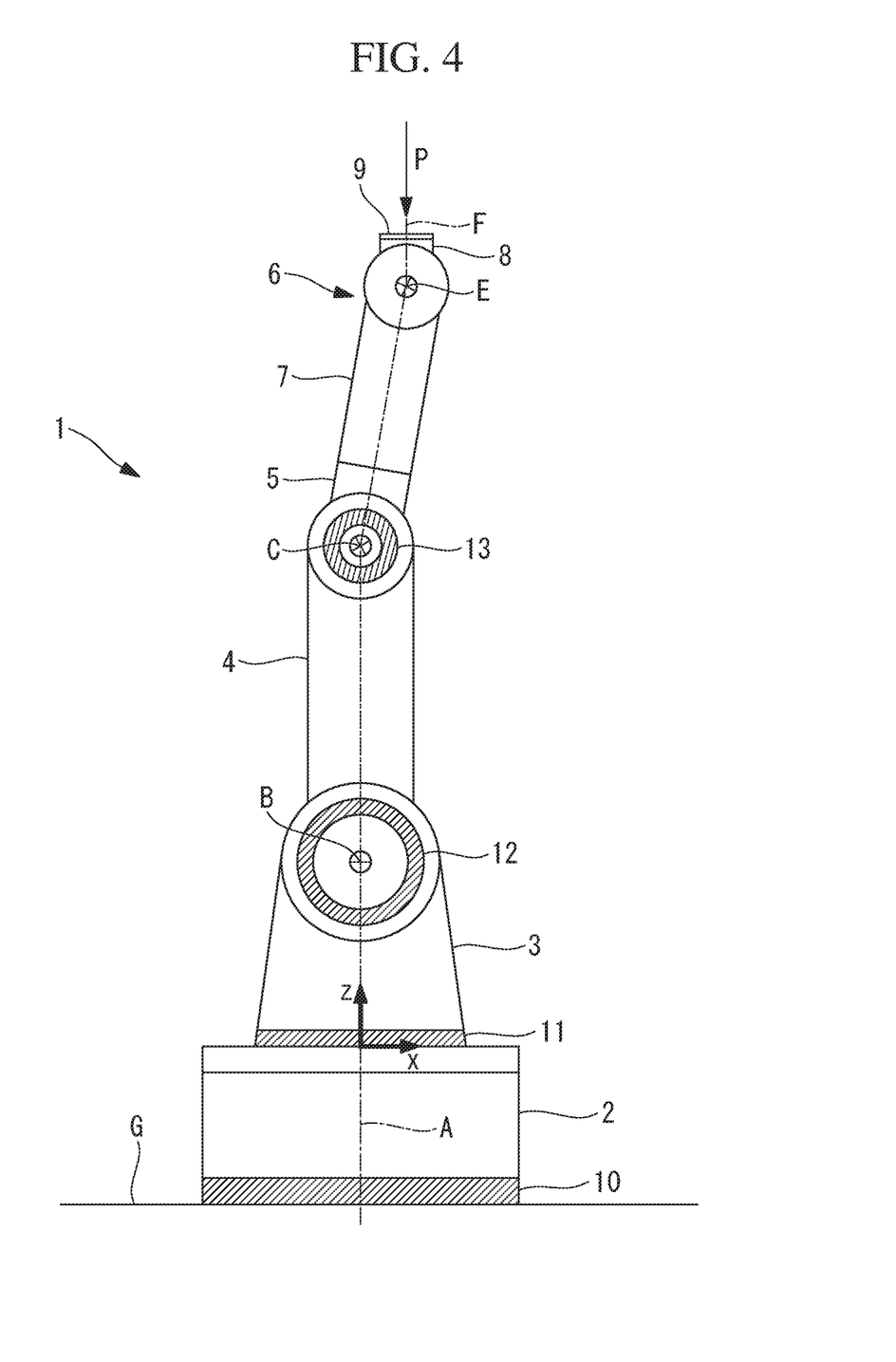
FIG. 4 is a side view illustrating a contact condition that cannot be detected by the robot of FIG. 1.

That is, the force sensor 11 is provided in the first arm 4, so that, even in the contact condition illustrated in FIG. 4, it is possible to perform accurate detection by moving the direction of force capable of being detected by the single axis force sensor 11 in accordance with the operation angle of the first arm 4.

In this embodiment, a case where the rotary barrel 3 and the first arm 4 are not offset in the direction along the J2 axis B is exemplified. However, in place of the above, a case where the rotary barrel 3 and the first arm 4 are offset in the direction along the J2 axis B may be applied.

Figure 6:
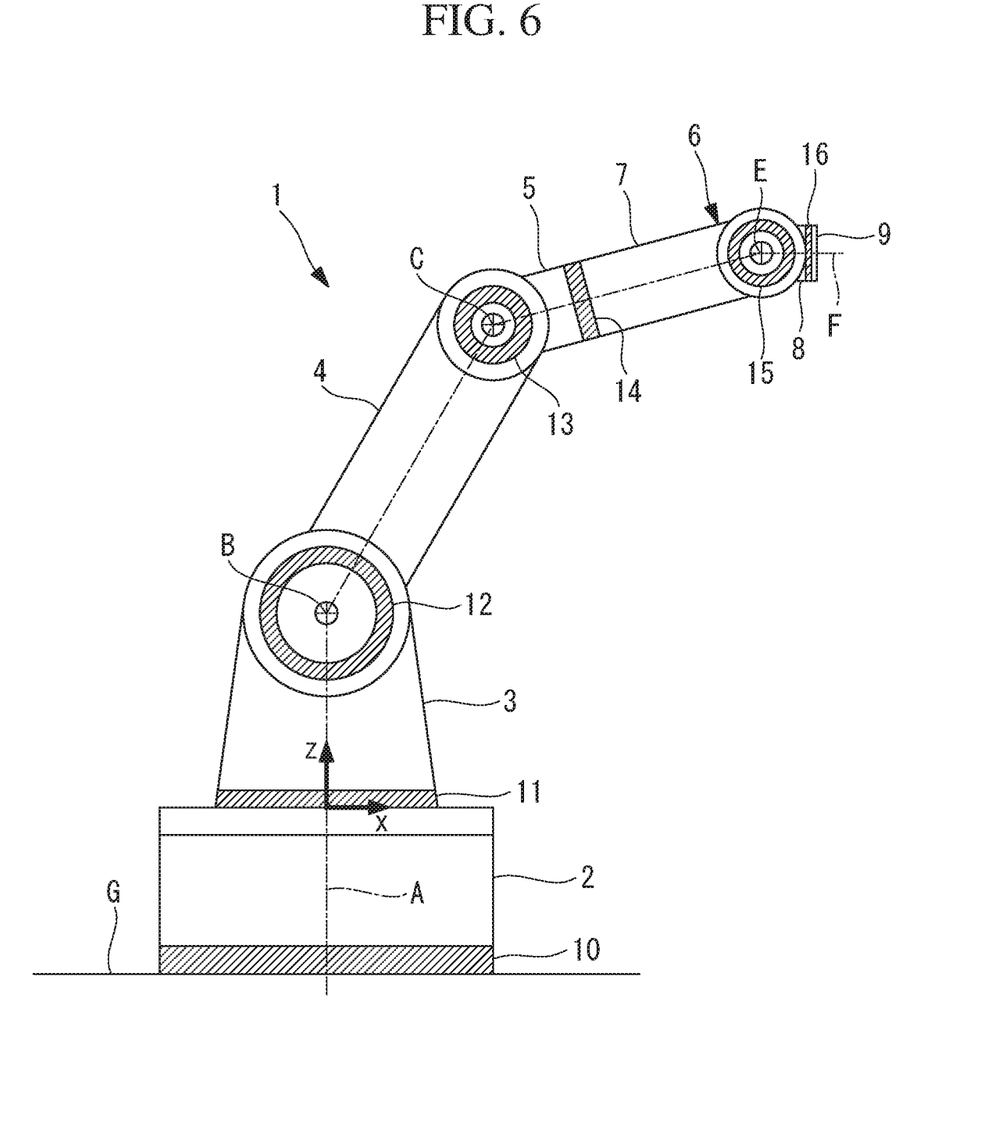
FIG. 6 is a side view illustrating another modification of the robot of FIG. 1.

In this embodiment, a case where the torque around each of the J1 axis A to the J3 axis C is detected is described. However, in place of the above, single axis torque sensors 14, 15, 16 that detect torque around the J4 axis D, torque around the J5 axis E and torque around the J6 axis F, respectively may be disposed. As illustrated in FIG. 6, the single axis torque sensors 10, 12, 13, 14, 15, 16 that detect torque around all axes, namely the J1 axis A to the J6 axis F, respectively may be disposed. Particularly, the single axis torque sensor (fourth single axis torque detection unit) 15 that detects the torque around the J5 axis E is disposed, so that it is possible to detect interposing between the first wrist element 7 and the second wrist element 8, or interposing between a tool (not illustrated) mounted on the wrist unit 6, and each part of the robot 1.

In a case where an object is interposed between a tool (not illustrated) mounted on the third wrist element 9, and each part of the robot 1, interposing can be detected by the single axis torque sensor (fifth single axis torque detection unit) 16 that detects the torque around the J6 axis F, or the single axis torque sensor (sixth single axis torque detection unit) 14 that detects the torque around the J4 axis D.

In a case where the torque around each of the J4 axis D to the J6 axis F is detected, or in a case where the torque around each of all axes, namely the J1 axis A to the J6 axis F is detected, the force sensor 11 may be mounted on the second arm 5. Consequently, even when force that acts on a tip of the third wrist element 9 in the direction along the J4 axis D cannot be detected by the single axis torque detection units 14, 15, 16, the force that acts in the direction along the J4 axis D can detected by the force sensor 11 mounted on the second arm 5.

The force sensor 11 may be mounted on the wrist unit 6. Consequently, it is possible to detect force that acts in the direction along the J4 axis D on the tip side with respect to a mounting position of the force sensor 11.

As the wrist unit 6, the first wrist element 7 only needs to be rotatably supported at the tip of the second arm 5 around the fourth axis D with respect to the second arm 5 by the second arm 5, the second wrist element 8 only needs to be rotatably supported around the fifth axis E orthogonal to the fourth axis D with respect to the first wrist element 7, and the third wrist element 9 only needs to be rotatably supported around the sixth axis F orthogonal to the fifth axis E and parallel to the fourth axis D with respect to the second wrist element 8. In this case, the single axis torque detection units 14, 15, 16 can detect only at least one of the torque around the fourth axis D, the torque around the fifth axis E and the torque around the sixth axis F.

As the wrist unit 6, a unit, in which the first wrist element 7 is rotatably supported around the fourth axis D orthogonal to the longitudinal axis of the second arm 5 at the tip of the second arm 5 by the second arm 5, the second wrist element 8 is rotatably supported around the fifth axis E orthogonal to the fourth axis D with respect to the first wrist element 7, and the third wrist element 9 is rotatably supported around the sixth axis F orthogonal to the fifth axis E and parallel to the fourth axis D with respect to the second wrist element 8, may be employed.

In this embodiment, the vertical articulated type robot 1 is exemplified. However, in place of this, a horizontal articulated type robot may be employed. In this case, a single axis torque sensor (first single axis torque detection unit) is disposed between a base (first member) and a first arm (second member) that swings around a vertical J1 axis (first axis) with respect to the base. Additionally, a single axis torque sensor (second single axis torque detection unit) is disposed between the first arm, and a second arm (third member) that swings around a J2 axis (second axis) parallel to the J1 axis with respect to the first arm. As the single axis torque sensor, at least one of the first single axis torque detection unit and the second single axis torque detection unit only needs to be disposed.

A force sensor capable of detecting force in the direction along the first arm may be disposed at any position from the floor surface to the first arm.

Consequently, it is possible to accurately detect interposing between the base and the first arm, interposing between the first arm and the second arm, and force to be applied in the direction along a straight line in a state in which the first arm and the second arm are disposed in the straight line manner.

In this embodiment, the single axis torque sensor is exemplified as the torque detection unit that detects torque. However, in place of the above, a current of a motor that drives each part may be detected, and torque may be estimated.

In a case where a secondary encoder is provided, torque may be estimated on the basis of angle information detected by the secondary encoder.

Figure 7:
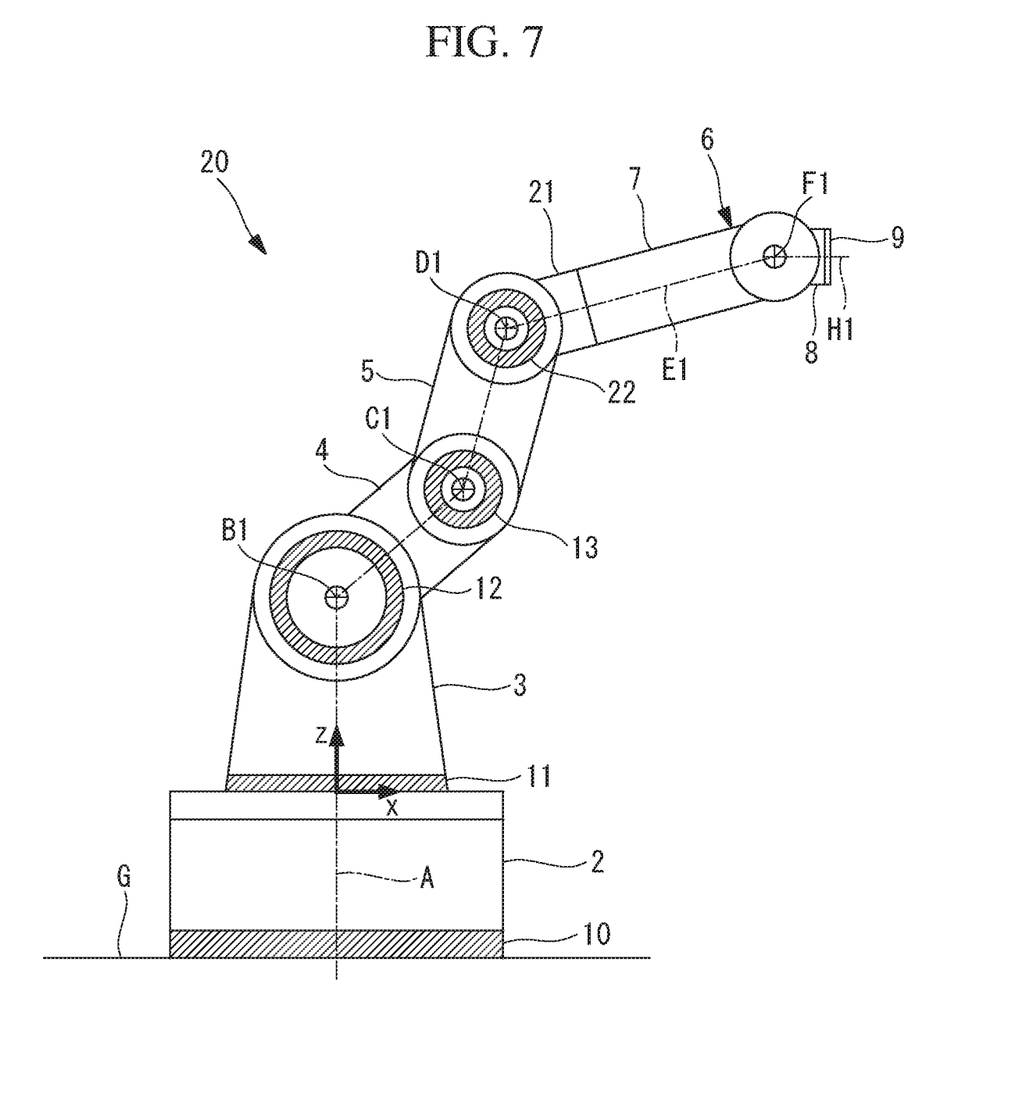
FIG. 7 is a side view illustrating another modification of the robot of FIG. 1.

While the 6-axis articulated type robot 1 is exemplified, the present invention may be applied to a 7-axis articulated type robot 20 illustrated in FIG. 7. In this case, single axis torque sensors 10, 12, 13, 22 that detect torque around a J1 axis A1 to a J4 axis D1, respectively only need to be disposed. Reference numeral 21 denotes a third arm rotatably supported around the J4 axis D1 parallel to the J3 axis C1 with respect to the second arm 5.

In this case, similarly to the 6-axis articulated type robot 1, there is a contact condition that cannot be detected by the single axis torque sensors 10, 12, 13, 22. Specifically, in a case where the first arm 4, the second arm 5 and the third arm 21 extend in the direction along the J1 axis A, the single axis torque sensors 10, 12, 13, 22 cannot detect force that acts on a tip of the third arm 21 in the direction along the J1 axis A. Therefore, it is necessary to provide the force sensor 11 capable of detecting force in at least the two directions including the direction along the J1 axis A. Consequently, even in a contact condition that cannot be detected by the single axis torque sensors 10, 12, 13, 22, it is possible to perform accurate detection by moving the direction of force capable of being detected by the single axis force sensor 11 in accordance with the operation angle of the first arm 4.

In this case, the first wrist element 7 is rotatably supported around the J5 axis E1 extending in the longitudinal direction of the third arm 21 by the third arm 21. The second wrist element 8 is rotatably supported around the J6 axis F1 orthogonal to the J5 axis E1 by the first wrist element 7, and the third wrist element 9 is rotatably supported around a J7 axis H1 orthogonal to the J6 axis F1 and passing through an intersection of the J5 axis E1 and the J6 axis F1 by the second wrist element 8.

The present invention may be applied to a single axis robot. In this case, a robot 1 includes a base (first member) 2 installed on a floor surface G, a first arm (second member) rotatably supported around a horizontal axis (first axis) with respect to the base 2, a single axis torque sensor 10 that detects torque around the horizontal axis, and a force sensor 11 provided between the base 2 and the floor surface G, as the single axis robot. The force sensor 11 may be provided in the base 2 or the first arm 4.

Although the robot including the three single axis torque sensors 10, 12, 13 is exemplified as the robot 1 according to this embodiment, a robot including at least one of the two single axis torque sensors 12, 13 may be employed.

Although the robot in which the J2 axis B that is the first axis, and the J3 axis C that is the second axis are parallel at an interval is exemplified in this embodiment, the two axes B, C only need to be disposed at an interval. For example, the two axes B, C may be disposed at an interval in relation of twist.

The invention claimed is:

1. A robot, comprising:
   a base;
   at least one rotationally driven member,
   a wrist unit, and
   wherein a first of the at least one rotationally driven member is rotationally coupled to the base to rotate about a first axis, and any successive members of the at least one rotationally driven member are rotationally coupled to a preceding one of the at least one rotationally driven members to rotate about a respective axis,
   wherein the wrist unit is rotatably attached to a last of the at least one rotationally driven member,
   wherein at least one of the first axis and the respective axes is provided with precisely one single-axis torque sensor for measuring torque about a corresponding axis, and
   wherein precisely one uniaxial force sensor is provided and is located to measure force along, parallel to, or orthogonal to one of the first axis and the respective axes.

2. The robot according to claim 1, wherein the at least one rotationally driven member is a single rotationally driven member, such that the single rotationally driven member is rotatably coupled to the base and the wrist unit is attached to the single rotationally driven member.

3. The robot according to claim 1, wherein the at least one rotationally driven member is three rotationally driven members.

4. The robot according to claim 1, wherein the at least one rotationally driven member is four rotationally driven members.

5. The robot according to claim 1, wherein the wrist unit is a three-axis wrist unit.

6. The robot according to claim 1, wherein the single-axis torque sensor is configured to correlate torque with motor current.

7. The robot according to claim 1, wherein the single-axis torque sensor is an encoder which is configured to correlate torque with angle information.

8. The robot according to claim 1, wherein the uniaxial force sensor is arranged between the first rotationally driven member and the base.

9. The robot according to claim 8, wherein the uniaxial force sensor is oriented to measure force orthogonal to the first axis.

10. The robot according to claim 8, wherein the uniaxial force sensor is oriented to measure force along or parallel to the first axis.

11. The robot according to claim 1, wherein the uniaxial force sensor is arranged on one of the rotationally driven members and is oriented to measure force along a longitudinal axis of said rotationally driven member.

12. The robot according to claim 1, wherein the robot is configured to identify contact with an object or pinching of the object between any two of the base and the at least one rotationally driven member when torque measured by the single-axis torque sensor and/or force measured by the uniaxial force sensor exceeds one or more predetermined thresholds.

13. The robot according to claim 1, wherein the robot is configured to identify contact with an object when torque measured by the single-axis torque sensor and/or force measured by the uniaxial force sensor exceeds one or more predetermined thresholds, and
   wherein the predetermined thresholds are configured such that, in a case in which an orientation of the at least one rotationally driven member prevents the single-axis torque sensor from exceeding its respective threshold despite contact between the robot and the object, contact may still be identified based on the uniaxial force sensor alone.

14. A robot, comprising:
   a base;
   at least one rotationally driven member,
   a wrist unit, and
   wherein a first of the at least one rotationally driven member is rotationally coupled to the base to rotate about a first axis, and successive members of the at least one rotationally driven member are rotationally coupled to a preceding one of the at least one rotationally driven members to rotate about a respective axis,
   wherein the wrist unit is attached to a last of the at least one rotationally driven member,
   wherein at least one of the first axis and the respective axes is provided with precisely one single-axis torque sensor for measuring torque about a corresponding axis, and
   wherein precisely one force sensor is provided which measures force in only two directions.

15. A robot, comprising:
   a base;
   at least one rotationally driven member,
   a wrist unit, and
   wherein a first of the at least one rotationally driven member is rotationally coupled to the base to rotate about a first axis, and successive members of the at least one rotationally driven member are rotationally coupled to a preceding one of the at least one rotationally driven members to rotate about a respective axis,
   wherein the wrist unit is attached to a last of the at least one rotationally driven member,
   wherein at least one of the first axis and the respective axes is provided with precisely one single-axis torque sensor for measuring torque about a corresponding axis, and
   wherein precisely one force sensor is provided which measures force in only three directions.

* * * * *